United States Patent [19]
Child et al.

[11] 3,890,113
[45] June 17, 1975

[54] PRODUCTION OF METHANE
[75] Inventors: Edward T Child, Hacienda Heights; Allen M. Robin, Anaheim, both of Calif.
[73] Assignee: Texaco Inc., New York, N.Y.
[22] Filed: June 25, 1973
[21] Appl. No.: 373,533

[52] U.S. Cl. ............ 48/197 R; 48/209; 48/210; 48/214; 48/215; 252/372
[51] Int. Cl. .......... C10b 49/02; C10b 57/02
[58] Field of Search .......... 48/197 R, 202, 209–215; 252/372

[56] References Cited
UNITED STATES PATENTS

| | | | |
|---|---|---|---|
| 2,133,496 | 10/1938 | Winkler et al. | 48/211 |
| 2,660,521 | 11/1953 | Teichmann | 48/211 X |
| 2,662,816 | 12/1953 | Kalbach | 48/202 |
| 2,963,348 | 12/1960 | Sellers | 48/197 R X |
| 3,069,249 | 12/1962 | Herbert et al. | 48/197 R |
| 3,511,624 | 5/1970 | Humphries et al. | 48/197 R |
| 3,531,267 | 9/1970 | Gould | 48/213 |
| 3,709,669 | 1/1973 | Marion et al. | 48/215 |

Primary Examiner—S. Leon Bashore
Assistant Examiner—Alfred D'Andrea, Jr.
Attorney, Agent, or Firm—T. H. Whaley; C. G. Ries; Albert Brent

[57] ABSTRACT

Continuous process for the production of a gaseous stream comprising about 50 to 97 mole % methane (dry basis) or higher from a sulfur containing hydrocarbonaceous fuel without polluting the environment.

A gaseous stream comprising $H_2$ and CO produced by the partial oxidation of a hydrocarbonaceous fuel is subjected to water gas shift reaction to produce a gaseous stream rich in $H_2$ and $CO_2$. Acid gases i.e. $CO_2$ and $H_2S$ are separately removed leaving a hydrogen-rich gas stream. At least a portion of the $CO_2$ previously recovered is recombined with the hydrogen-rich stream to produce a gaseous mixture having a mole ratio $H_2/CO_2$ of about 4 to 10. This gas mixture is subjected to conventional catalytic methanation to produce a fuel gas comprising in mole % (dry basis) $H_2$ 45 to 1, and $CH_4$ 50 to 99. By using the reaction of $CO_2$ and $H_2$ rather than the reaction of CO and $H_2$, a reduction of about 25% in the very large heat release encountered with the methanation reaction may be achieved.

Optionally, substantially pure methane may be produced by adding a second portion of $CO_2$ to the aforesaid fuel gas to produce a gaseous mixture having a mole ratio $H_2/CO_2$ of about 4, subjecting said gas mixture to conventional catalytic methanation to produce $CH_4$ and $H_2O$, and separating $H_2O$ from the process gas stream to produce substantially pure methane. Thus, the normally vigorous exothermic methanation reaction may be controlled better by the stepwise addition of $CO_2$ to react with the hydrogen in the process gas stream.

10 Claims, 1 Drawing Figure

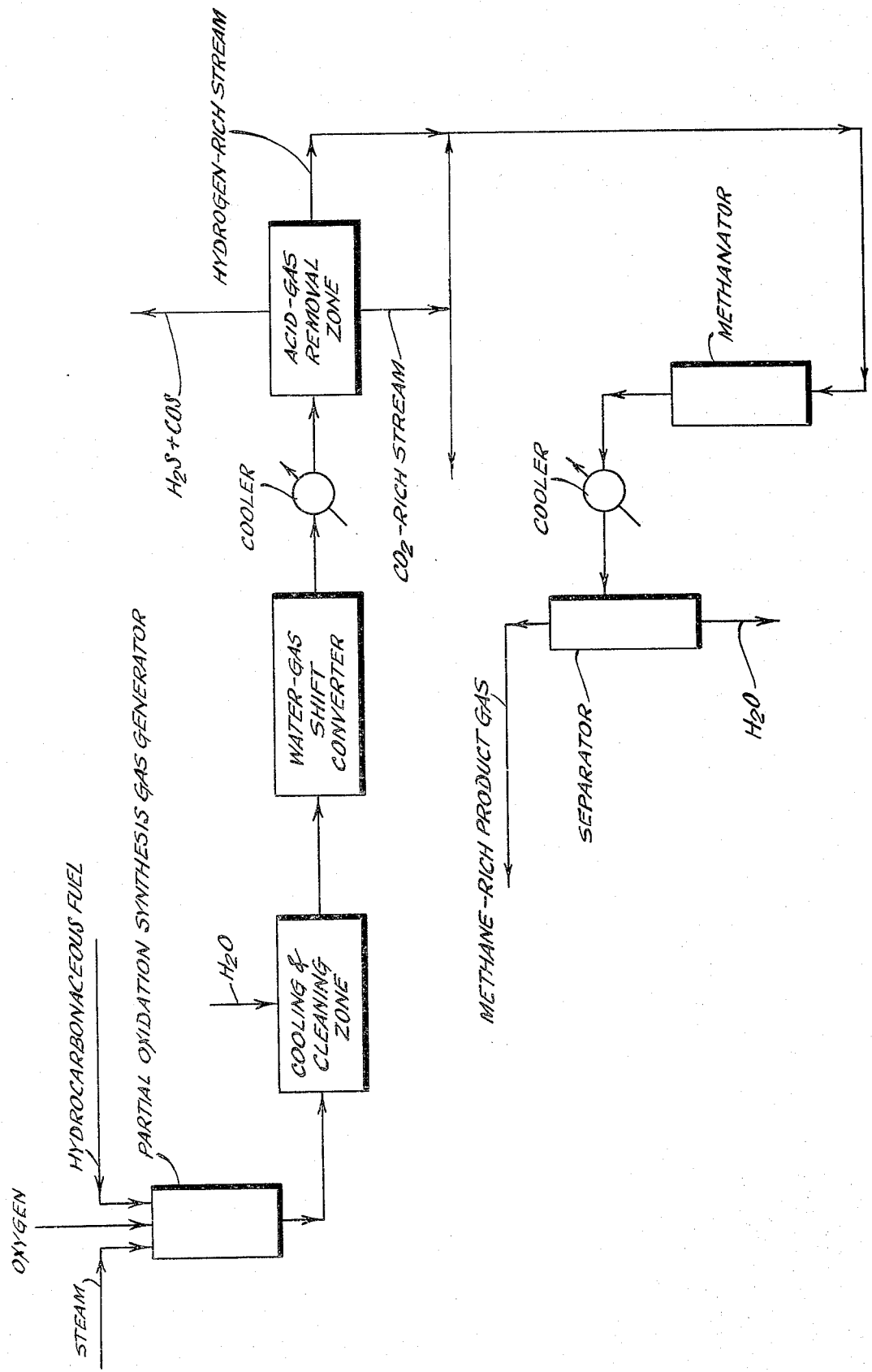

PRODUCTION OF METHANE

BACKGROUND OF THE INVENTION

1. Field of the Invention

This invention relates to a continuous process for the production of a gaseous stream comprising about 50 to 97 mole % methane (dry basis), or more.

2. Description of the Prior Art

Fossil fuels, which took nature millions of years to create, are being consumed at such prodigious rates that available petroleum supplies may be good for only 50 more years and coal supplies for two or three more centuries. The accelerating demand for fuel has contributed to the present energy crisis. A typical natural gas contains about 94.9% methane. Since natural gas appears to be the scarcest of the fossil fuels, the development of an economical nonpolluting process for producing synthetic natural gas or substantially pure methane from sulfur containing coal and comparatively low cost petroleum crude or residual products is of considerable importance.

A large amount of heat is released during the catalytic reaction of $H_2$ and $CO$ to produce $CH_4$. Accordingly, sophisticated, complex, and costly methanation systems would ordinarily be required for the methanation of gas mixtures containing a high $CO + H_2$ content. In the subject process, the normally vigorous exothermic methanation reaction is controlled thereby permitting the use of comparatively low cost conventional fixed bed adiabatic reactors.

SUMMARY

This invention pertains to a process for producing a gaseous stream comprising about 50–97 mole % methane (dry basis), or more. By using the reaction of $CO_2$ and $H_2$ rather than the reaction of $CO$ and $H_2$, a reduction of about 25% in the very large heat release encountered with the methanation reaction may be achieved. In the process, a hydrocarbonaceous feedstock is subjected to partial oxidation with a free-oxygen containing gas comprising from about 90 to 99.9 mole % $O_2$, and optionally with a temperature moderator. The partial oxidation reaction takes place in a free-flow noncatalytic refractory lined synthesis gas generator at an autogenous temperature in the range of about 1,200° to 3,500°F. and a pressure in the range of about 1 to 350 atmospheres. The effluent gas stream from the gas generator principally comprises $CO$, $H_2$, $CO_2$, and $H_2O$ and optionally contains particulate carbon, $CH_4$, $H_2S$ and $COS$.

The raw process gas stream from the gas generator is cooled, cleaned and mixed with supplemental $H_2O$ to produce a feed gas for water-gas shift conversion having a mole ratio $H_2O/CO$ in the range of about 2 to 8. At least 75 mole % of the $CO$ is reacted with $H_2O$ by catalytic water-gas shift reaction to produce $H_2$ and $CO_2$. After cooling, a stream of $CO_2$-rich gas is removed from the process gas stream and optionally a separate stream of $H_2S$ and $COS$ thereby producing a hydrogen-rich gas stream. In a catalytic methanation zone, $H_2$ and substantially all of the carbon oxides in a process gas stream comprising said hydrogen-rich gas stream in admixture with at least a portion of said separated stream of $CO_2$-rich gas react to product a process gas stream substantially comprising $CH_4$, $H_2$, and $H_2O$. The process gas stream is cooled to separate out the $H_2O$, producing a process gas stream comprising in mole %; $CH_4$ 50 to 99, and $H_2$ 45 to 1. Optionally, another portion of said separated $CO_2$-rich gas stream is added to said fuel gas stream in an amount sufficient to react with substantially all of the residual hydrogen in a second catalytic methanation zone to produce a gas stream substantially comprising $CH_4$ and $H_2O$. Water is then removed from this gas stream by cooling, producing a stream of substantially pure $CH_4$ i.e. about 97 mole %, or more.

BRIEF DESCRIPTION OF THE DRAWING

The invention will be better understood by reference to the drawing, which illustrates a preferred embodiment of the disclosed process.

DESCRIPTION OF THE INVENTION

The present invention involves an improved continuous process for the production of a gaseous stream comprising 50 to 97 mole % $CH_4$ (dry basis) or more from a hydrocarbonaceous fuel.

A particular advantage of the subject process is that it employs as feedstock readily available, comparatively low cost, hydrocarbonaceous materials e.g., liquid and solid fuels which may contain a comparatively high content of ash and sulfur. The product gas has a heating value in the range of about 700 to 1005 British Thermal Unit per standard cubic foot (BTU/SCF), depending upon the methane content. It may be used as a substitute for natural gas or in organic chemical synthesis when the methane content is greater than 95 mole %. For example, methanol or formaldehyde may be made by the direct oxidation of methane.

In the subject process, first a continuous stream of process gas is produced in the reaction zone of a separate free-flow unpacked noncatalytic partial oxidation gas generator. The gas generator is preferably a refractory lined vertical steel pressure vessel, such as described in coassigned U.S. Pat. No. 3,639,261 - W. L. Slater.

A wide range of combustible carbon containing organic hydrocarbonaceous materials may be introduced into the reaction zone of the gas generator by way of a burner to be further described. The hydrocarbonaceous fuel is reacted in the gas generator with a free-oxygen gas containing from 90 to 99.9 mole % $O_2$. Optionally, a temperature-moderating gas may be present.

The term hydrocarbonaceous as used here to describe various suitable feedstocks is intended to include gaseous, liquid, and solid hydrocarbons, carbonaceous materials, and mixtures thereof. In fact, substantially any combustible carbon containing organic material, or slurries thereof, may be included within the definition of the term "hydrocarbonaceous." For example, there are (1) pumpable slurries of solid carbonaceous fuels, such as coal, particulate carbon, petroleum coke, concentrated sewer sludge, and mixtures thereof; (2) gas-solid suspensions, such as finely ground solid carbonaceous fuels dispersed in either a temperature-moderating gas or in a gaseous hydrocarbon; and (3) gas-liquid-solid dispersions, such as atomized liquid hydrocarbon fuel or water and particulate carbon dispersed in a temperature-moderating gas. The hydrocarbonaceous fuel may have a sulfur content in the range of about 0 to 10 weight percent and an ash content in the range of about 0 to 15 weight percent.

Liquid hydrocarbon fuels are the preferred feedstocks. The term liquid hydrocarbon or liquid hydrocarbon fuel, as used herein to describe suitable liquid feedstocks, is intended to include various materials such as liquefied petroleum gas, petroleum distillates and residues, gasoline, naphtha, kerosine, crude petroleum, asphalt, gas oil, residual oil, tar-sand and shale oil, coal oil, aromatic hydrocarbons (such as benzene, toluene, xylene fractions), coal tar, cycle gas oil from fluid-catalytic-cracking operations, furfural extract of coker gas oil, and mixtures thereof. Gaseous hydrocarbon fuels, as used herein to describe suitable gaseous feedstocks, include ethane, propane, butane, pentane, refinery gas, acetylene tail gas, ethylene off-gas, and mixtures thereof. Both gaseous and liquid feeds may be mixed and used simultaneously and may include paraffinic, olefinic, naphthenic, aromatic compounds in any proportion, and the waste products thereof.

Also included within the definition of the term hydrocarabonaceous are oxygenated hydrocarbonaceous organic materials including carbohydrates, cellulosic materials, alkehydes, organic acids, alcohols, ketones, oxygenated fuel oil, waste liquids and by-products from chemical processes containing oxygenated hydrocarbonaceous organic materials and mixtures thereof.

The hydrocarbonaceous feed may be at room temperature; or it may be preheated to a temperature up to as high as about 600° to 1,200°F., but preferably below its cracking temperature. The hydrocarbonaceous feed may be introduced into the burner in liquid phase or in a vaporized mixture with a temperature moderator. Suitable temperature moderators include $H_2O$, $CO_2$, a portion of cooled clean process gas, and mixtures of the aforesaid temperature moderators.

The use of a temperature moderator to moderate the temperature in the reaction zone is optional and depends in general on the carbon to hydrogen ratio of the feedstock and the oxygen content of the oxidant stream. A temperature moderator may not be required with some gaseous hydrocarbon fuels; however, generally one is used with liquid hydrocarbon fuels. When a $CO_2$-containing gas stream such as that obtained subsequently in the process in the acid-gas separation zone, is used as the temperature moderator, the mole ratio ($CO/H_2$) of the effluent product stream may be increased. As previously mentioned, the temperature moderator may be introduced in admixture with either or both reactant streams. Alternatively, the temperature moderator may be introduced into the reaction zone of the gas generator by itself via a separate conduit in the fuel burner.

When $H_2O$ is charged to the reaction zone, it may be in liquid or gaseous phase. It may be in the form of steam or water droplets. Further, the $H_2O$ may be mixed either with the hydrocarbonaceous feedstock or with the free-oxygen containing gas, or with both. For example, a portion of the steam may be intermixed with oxygen in an amount less than about 25 weight percent of the oxygen and any remainder mixed with hydrocarbonaceous materials. The $H_2O$ may be at a temperature in the range of ambient to 1,000°F., or more. The weight ratio of water to hydrocarbonaceous feed may be in the range of about 0.0 to 5.0 with liquid hydrocarbon fuels, preferably about 3.0 to 5.0 lbs. of $H_2O$ are charged per lb. of hydrocarbonaceous feed.

The term free-oxygen containing gas or gaseous oxidant as used herein is intended to mean on a dry basis, from about 90 to 99.9 mole % $O_2$, 0 to 9.9 mole % $N_2$, and less than 0.1 mole % rare gases. The free-oxygen containing gas may be passed through the burner at a temperature in the range of about ambient to 1,800°F. The ratio of free-oxygen in the gaseous oxidant to carbon in the feedstock (O/C, atom/atom) is in the range of about 0.6 to 1.5, suitably about 0.7 to 1.2, and preferably below 1.0.

The feedstreams are introduced into the reaction zone of the fuel gas generator by means of a fuel burner. Suitably, an annulus-type burner, such as described in coassigned U.S. Pat. No. 2,928,460 issued to duBois Eastman et al., may be employed.

The feedstreams are reacted by partial oxidation without a catalyst in the reaction zone of a free-flow gas generator at an autogenous temperature in the range of about 1,200° to 3,500°F. and at a pressure in the range of about 1 to 350 atmospheres absolute (atm. abs.). Preferably, the reaction temperature is in the range of about 1,500° to 2,000°F. and the reaction pressure is preferably in the range of about 25 to 95 atm. abs. The reaction time in the fuel gas generator is about 1 to 10 seconds. The mixture of effluent process gas leaving the gas generator may have the following dry gas composition in mole %:

$CO$ 9 to 50, $H_2$ 26 to 48, $CO_2$ 38 to 4, $N_2$ 0 to 5, $CH_4$ 27 to 0.1, $H_2S$ nil to 2.0, $COS$ nil to 0.1, and A 0.1 to 0.2. Unreacted particulate carbon (on the basis of carbon in the feed by weight) is about 0.2 to 20 weight percent from liquid and solid fuels and is usually negligible from gaseous hydrocarbon feeds.

To produce an effluent gas stream from the gas generator containing at least 10 mole % $CH_4$ (dry basis) as disclosed in coassigned U.S. Pat. No. 3,688,438, the gas generator should be operated as follows: autogenous reaction temperature-1,200° to 1,700°F., pressure-1 to 350 atmosphere, atomic ratio of free oxygen to carbon about 0.60 to 1.2, and weight ratio steam to fuel-3–5 to 1.

While the remaining steps in the process may be conducted at various pressures in the range of about 1 to 350 atm. abs., preferably all of the remaining steps are conducted at the same pressure as that in the gas generator less ordinary drop in the line.

Any ash or slag in the hydrocarbonaceous fuel may be separated from the effluent gas stream leaving the gas generator in a suitable gas-solids separating zone. For example, a vertical slag chamber with a side outlet for the gas stream may be connected in axial alignment with the free-flow gas generator. Ash and other solids in the gas stream discharging from the lower part of reaction chamber may drop directly into a pool of water at the bottom of the slag chamber where it may be periodically removed. A typical arrangement for this is shown in coassigned U.S. Pat. 3,639,261.

In the subject process, at least 75 mole % of the $CO$ in the effluent gas stream from the gas generator is reacted with $H_2O$ to produce $CO_2$ and $H_2$ by the catalytic water-gas shift reaction. The $CO_2$ in the process gas stream may be reacted with the $H_2$ therein to produce methane by the catalytic methanation reaction. By this scheme in comparison with the exothermic reaction between $CO$ and $H_2$ to produce methane, advantageously there may be achieved a reduction of about 25% in the very large amount of heat released.

The effluent gas stream from the gas generator is cooled to a temperature in the range of about 600° to 750°F. Preferably, this cooling may be effected by direct contact with water in a quench tank, thereby simultaneously cleaning the process gas stream and vaporizing supplemental $H_2O$ into the process gas stream. By this means a raw syngas stream may be produced containing more than the minimum amount of water required for a subsequent water-gas shift reaction. For example, with a quench temperature of about 400°F. the effluent gas stream from the quench tank would contain 7 moles of $H_2O$ per mole of CO in the gas. For example, a conventional quench tank is shown in coassigned U.S. Pat. No. 2,896,927. If required, additional scrubbing may be carried out in scrubbing column, to be further described. Alternatively, the effluent gas stream may be cooled by indirect heat exchange with water in a waste-heat boiler, thereby producing steam at a temperature in the range of about 450° to 700°F. for use elsewhere in the process. A suitable arrangement utilizing a waste-heat boiler is shown in coassigned U.S. Pat. No. 3,709,669.

When indirect heat exchange is employed, the stream of process gas leaving the waste heat boiler may be passed into a gas cleaning zone where particulate carbon and any other remaining entrained solids may be removed. Contamination of the water-gas shift and methanation catalysts is thereby prevented. A slurry of particulate carbon in a liquid hydrocarbon fuel may be produced in the gas cleaning zone. Optionally, this slurry may be then recycled to the gas generator as at least a portion of the feedstock. Any conventional procedure suitable for removing suspended solids from a gas stream may be used. In one embodiment of the invention, the stream of fuel gas is introduced into a gas-liquid scrubbing zone where it is scrubbed with a scrubbing fluid such as a liquid hydrocarbon or water. A suitable liquid-gas tray-type column is more fully described in Perry's Chemical Engineers' Handbook, Fourth Edition, McGraw-Hill 1963, Pages 18-3 to 5.

Thus, by passing the stream of process gas up a scrubbing column in direct contact and countercurrent flow with a suitable scrubbing fluid or with dilute mixtures of particulate carbon and scrubbing fluid flowing down the column, the particulate carbon may be removed from the process gas stream. A slurry of particulate carbon and scrubbing fluid is removed from the bottom of the column and sent to a carbon separation or concentration zone. This may be done by any conventional means that may be suitable e.g., filtration, centrifuge, gravity settling, or by liquid hydrocarbon extraction such as the process described in coassigned U.S. Pat. No. 2,992,906. Clean scrubbing fluid or dilute mixtures of scrubbing fluid and particulate carbon may be recycled to the top of the column for scrubbing more fuel gas.

Other suitable conventional gas cooling and cleaning procedures may be used in combination with or in place of the aforesaid scrubbing column. For example, the partially cooled process gas stream may be introduced below the surface of a pool of quenching and scrubbing fluid by means of a dip-tube unit. Or the process gas stream may be passed through a plurality of scrubbing steps including the orifice-type scrubber or venturi or nozzle scrubber, such as shown in Perry's Chemical Engineers' Handbook, Fourth Edition, McGraw-Hill 1963, Pages 18-54 to 56 and coassigned U.S. Pat. No. 3,639,261. The aforesaid gas scrubbing step may not be necessary with gaseous hydrocarbon fuels that produce substantially no particulate carbon.

The effluent gas stream from the gas generator which has been cooled and cleaned, as previously described, and which contains supplemental $H_2O$ to provide a mole ratio $H_2O/CO$ in the range of about 2 to 8, and preferably 3 to 4 is reacted in a conventional water-gas shift converter. The shift converter may be of a fixed bed or fluidized design and contains a conventional sulfur resistant water-gas shift catalyst. A typical sulfur resistant shift catalyst comprises 95% $Fe_2O_3$ and 4% $Cr_2O_3$. The space velocity may range from 500 to 50,000 standard cubic feet of gas per cubic feet of catalyst per hour (SCF/CF $hr^{-1}$). For example, a CO conversion of 92% with the aforesaid iron oxide-chromium oxide catalyst may be achieved with a feed gas comprising 35 mole % CO at a temperature of 842°F. and a pressure of 365 psia, a space velocity of about 1,000 SCF/CF $hr^{-1}$, and a steam: CO mole ratio of 5.7.

At least 75 mole % of the CO in the feed gas to the water-gas shift converter is converted into $H_2$ and $CO_2$. The effluent gas stream from the water-gas shift converter is cooled in a waste heat boiler from a temperature in the range of about 750° to 950°F. to a temperature in the range of about 275° to 570°F. The steam produced may be used where needed elsewhere in the process. The effluent gas stream from the water gas shift converter after removing any excess water may have the following dry gas composition in mole %: $H_2$ 30 to 62, $CO_2$ 43 to 27, $CH_4$ 0.5 to 26, CO 0.5 to 9, A + $N_2$ 0.1 to 4, $H_2S$ 0 to 1.8, and COS 0 to 0.1.

In an acid-gas removal zone, $CO_2$, $H_2S$, COS, $H_2O$, $NH_3$, and other gaseous impurities may be removed from the cooled and cleaned process gas stream leaving the water-gas shift conversion zone. Suitable conventional processes may be used involving refrigeration and physical or chemical absorption with solvents, such as methanol, n-methylpyrrolidone, triethanolamine, propylene carbonate, or alternately with amines or hot potassium carbonate or methanol.

In solvent absorption processes, most of the $CO_2$ absorbed in the solvent may be released by simple flashing. The rest may be removed by stripping. This may be done most economically with nitrogen. Nitrogen is available as a low cost by-product from an air separation unit used to produce the free-oxygen containing gas used in the gas generator. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide. At least a portion of the stream of $CO_2$-rich gas comprising $CO_2$ in the range of about 95-99 mole %, and preferably more than 98.5% may be admixed with the reacting process gas stream in the methantion zone, to be further described. Excessive catalyst-bed temperatures may be prevented by distributing the $CO_2$-rich gas stream separately or in admixture with the hydrogen-rich gas stream throughout fixed or fluidized bed reactors by means of separate inlet points. A second portion of the $CO_2$-rich gas stream may be recycled to the fuel gas generator for use as all or a portion of the temperature-moderating gas. In such case, small amounts of $H_2S$ and COS may be contained in the $CO_2$ stream.

The $H_2S$ and COS containing solvent may be regenerated by flashing and stripping with nitrogen, or alternatively be heating and refluxing at reduced pressure without using an inert gas. The $H_2S$ and COS are then converted into sulfur by a suitable process. For example, the Claus process may be used for producing elemental sulfur from $H_2S$ as described in Kirk–Othmer Encyclopedia of Chemical Technology, Second Edition Volumn 19, John Wiley, 1969, Page 353. Excess $SO_2$ may be removed and discarded in chemical combination with limestone, or by means of a suitable commercial extraction process.

In general, the composition of the clean and dry hydrogen-rich process gas leaving the acid-gas removal zone in mole percent is about:

$H_2$ 52 to 93, CO 0.5 to 12, $CH_4$ 44 to 1, $CO_2$ 0 to 6, A 0.2 to 0.4, and $N_2$ 0 to 7. The temperature is in the range of about 60°F. to 180°F. and preferably about 70°F. to 100°F., and the pressure is in the range of about 1 to 350 atm. abs. and preferably 25 to 95 atm. abs., and most preferably at a pressure substantially the same as that produced in the fuel gas generator less ordinary line drop.

At least a portion of the $CO_2$-rich stream recovered from the acid-gas removal zone is recombined with the hydrogen-rich process gas stream from the acid-gas removal zone to provide a feed gas to the methanation reaction zone, as previously mentioned. The methanation reaction may be done in one or more stages e.g. 1 to 3. Each stage may consist of one or more beds of catalyst with provision for cooling between each bed but preferably without any water or $CO_2$ removed between beds. A provision to remove condensed water and to add $CO_2$ is preferably provided between each stage. Thus, in a single stage methanation zone, which may actually consist of from about one to three beds of catalyst, the mole ratio ($H_2/CO_2$) of the process gas stream reacting in the methanation zone at a temperature in the range of about 400° to 1,500°F., may be in the range of about 4 to 10, so as to produce an effluent gas stream after the first methanation stage comprising the following dry gas composition in mole %: $CH_4$ 50 to 96, $H_2$ 3 to 46, CO 0 to 0.5, $CO_2$ 0.3 to 0.7, and A+N 0.2 to 8. Note that substantially all of the carbon oxides in the process gas stream may be converted by this methanation stage into $CH_4$ and $H_2O$. Optionally, the feed gas stream to the methanator may be preheated by indirect heat exchange with the effluent gas stream from the methanator.

In a two stage methanation zone, as the reacting gas stream passes between the first and second catalyst stages, it may be cooled, dried, and mixed with a second portion of said $CO_2$-rich gas stream. For example, a two-stage methanator may consist of a single catalyst bed in stage 1 followed by one or more catalyst beds in the stage 2. In such case, the mole ratio ($H_2/CO_2$) of the process gas stream reacting in the first methanator is preferably greater than 4 so as to provide an excess of hydrogen. Then in the second catalyst stage at a temperature in the range of about 400° to 1,100°F., substantially all of the remaining hydrogen in the process stream may be reacted with supplemental $CO_2$ which is supplied by the addition of said second portion of $CO_2$-rich gas stream to produce about 97 mole % $CH_4$ or more (dry basis). The aforesaid second portion of $CO_2$-rich gas stream is supplied to the second methanator in an amount so as to provide therein a mole ratio ($H_2/CO_2$) of about 4 i.e., preferably stoichiometric quantities. By this means substantially all of the $H_2$ and carbon dioxide in the process gas stream may be converted into $CH_4$ and $H_2O$.

The sensible heat in the effluent gas stream may be recovered by indirect heat exchange with feed gas to the methanation zone as previously disclosed, or by producing steam in a waste heat boiler. Water is separated and removed during this cooling as well as at other points in the system where the gases are cooled below the dew point. The product gas substantially comprises $CH_4$ i.e. about 97 mole % or more.

Optionally, portions of effluent gas streams from either or both methanators may be recycled through their respective catalyst beds at ratios ranging from 1–50 volumes of recycle gas per volume of fresh feed gas and preferably at recycle ratios in the range of about 1 to 5. By this means, additional temperature control may be effected and the concentrations of methane in the effluent gas streams and the space velocity may be increased.

In contrast with the subject invention, when stoichiometric quantities of CO and $H_2$ are subjected to catalytic methanation in the manner disclosed in coassigned U.S. Pat. No. 3,709,669, special techniques and reactors may be necessary to prevent uncontrollable heat releases if upsets occur in the methanation reaction. Excessive catalyst-bed temperature may destroy the activity of the catalyst and reduce methane yields. By means of the subject invention, the maximum heat rise will be about 980°F. This is within the tolerable range of commercial methanation catalysts which can operate from about 400°F. inlet temperatures to 1,500°F. outlet temperatures.

Any conventional methanation catalyst may be employed in the subject process. This is especially true since $H_2S$ and any other gaseous sulfur compounds may be removed from the process gas stream in the acid-gas removal zone as previously described.

The group VIII transition elements, mainly iron, nickel, and cobalt, appear to be the most suitable for use as methanation catalysts. Typical commercial preparations contain about 33 to 78 weight percent of nickel oxide and about 12 to 67 percent of aluminum oxide and are used in the form of ⅜ × ⅜ inch or ¼ × ¼ inch cylindrical tablets. A typical nickel oxide catalyst is Girdler G65 produced by Chemetron Corp. Suitable catalyst compositions include the following: NiO-$Al_2O_3$ or NiO-MgO precipitated on kaolin and reduced with hydrogen; and also in parts by weight Ni 100, $ThO_2$ 6, MgO 12 and Kieselguhr (diatomaceous earth) 400 reduced with hydrogen for 2 hours at 752°F. followed by heating for 100 hours at 932°F. The life of a sulfur sensitive catalyst may be extended by maintaining the sulfur level in the reactant gases below about 0.005 grains of sulfur per thousand standard cubic feet. Steam may be added to the reactant gas to decrease the amount of carbon that is deposited; however, in such instance there may be a decrease in methane yield. A suitable operating temperature in the methanator is in the range of about 390° to 1500°F. For example, the preferable exit temperature for the aforesaid NiO—$Al_2O_3$ catalyst is about 662°F. Space velocities range from 100 to 10,000 standard volumes of gas per volume of catalyst ($hr^{-1}$) and pressures range from 1 to 350 atmospheres.

EXAMPLE

The following example illustrates a preferred embodiment of the process of this invention. While a preferred mode of operation is illustrated, the example should not be construed as limiting the scope of the invention. The process is continuous and the flow rates are specified on an hourly basis.

1,000,000 standard cubic feet (SCF) of a raw process gas stream is produced by the partial oxidation of a hydrocarbonaceous fuel, to be further described, with oxygen in a conventional vertical noncatalytic free-flow refractory-lined gas generator. The raw process gas stream is produced at an autogenous temperature of about 1700°F. and at a pressure of about 60 atm. abs. The average residence time in the gas generator is about 5 seconds. The effluent gas leaving the generator has the composition shown in Table I column 1. About 800 pounds of unconverted particulate carbon are entrained in the effluent stream of process gas. All of the gas analyses shown in Table I are on a dry basis. Water is removed from the system at several points where the gases are cooled to a temperature below the dew point.

The aforesaid process gas stream is produced by continuously introducing into a partial oxidation fuel gas generator by way of an annulus type burner the following charge: 28,300 pounds of reduced crude oil having the ultimate analysis (Wt.%) C 85.9, H 11.31, S 2.01, N 0.7, and ash 0.04. Further, the reduced crude oil has an API gravity of 12.9°, a gross heating value of 18,200 BTU/lb, and a viscosity of 822 Saybolt Seconds Furol at 122°F. Also, 390,000 SCF of substantially pure oxygen (95 mole % $O_2$ or more) at a temperature of 600°F. are simultaneously introduced into the reaction zone of the gas generator by way of said burner.

The hot effluent gas stream leaving the gas generator is passed directly into water in a conventional quench tank as shown in coassigned U.S. Pat. No. 2,818,326. By direct heat exchange with water in the quench tank, the stream of effluent gas is cooled and simultaneously, steam is produced. Substantially all of the particulate carbon in the process gas stream is removed as a water slurry in the quench tank. Any remaining solids may be removed from the process gas stream in a conventional gas-liquid scrubbing column. Optionally, as previously described a slurry of particulate carbon and crude oil may be produced from the carbon-water slurry and introduced into the gas generator as a portion of the feedstock.

About 19,500 pounds of supplemental $H_2O$ i.e. steam as previously produced are mixed with the cooled and cleaned effluent gas stream. The gas mixture at a temperature of 750°F. and a pressure of about 60 atm. abs. is introduced into a conventional catalytic water-gas shift reactor containing sulfur resistant iron oxide-chromium oxide water-gas shift catalyst i.e. 95% $Fe_2O_3$ and 4% $Cr_2O_3$, as previously described. The space velocity is 800 SCF of gas per CF of catalyst ($hr^{-1}$). The composition of the shifted gas is shown in Table I column 2. Thus, about 90 mole % of the CO is converted into $H_2$ and $CO_2$ by the water-gas shift reaction.

The effluent gas stream leaves the shift converter at a temperature of about 800°F. and is cooled to a temperature of 275°F. by indirect heat exchange with water in a waste heat boiler, thereby producing steam. The process gas stream is then introduced into a conventional acid-gas removal zone, as previously described. Substantially all of the $CO_2$, $H_2S$ and $H_2O$ are removed from the stream of process gas and a stream of acid gas-free process gas is produced having the composition shown in Table I column 3.

About 6,200 pounds of supplemental $CO_2$ from the $CO_2$ stream recovered previously in the acid gas removal zone are mixed with the clean hydrogen-rich gas stream leaving the acid gas removal zone. A feed gas mixture having a mole ratio ($H_2/CO_2$) of about 8.8 is produced having the composition shown in Table I column 4. This feed gas at a temperature of about 400°F. and a pressure of about 60 atm. abs. is introduced into a first conventional adiabatic fixed bed methanator containing a single bed of typical nickel oxide methanation catalyst as previously described. The space velocity is 4000 SCF of gas per CF of catalyst ($hr^{-1}$). The effluent gas stream departing from the first methanator at a temperature of about 1240°F. has the composition shown in Table I column 5. The process gas stream is then cooled in a waste heat boiler and mixed with 7,000 lbs. of $CO_2$ from the $CO_2$ stream produced in the said acid gas removal zone. A feed gas mixture to a second adiabatic catalytic methanator having a mole ratio ($H_2/CO_2$) of about 4 as shown in Table I column 6 is produced.

The second methanator and the catalyst therein are similar to the first methanator and catalyst except that at least two catalyst beds with cooling between beds are used to obtain the higher conversion to $CH_4$. The aforesaid feed gas mixture is introduced at a temperature of about 400°F. and a pressure of about 60 atm. abs. The space velocity is 4000 SCF of gas per CF of catalyst per hour. In the second methanator, substantially all of the $H_2$ and $CO_2$ are reacted together to produce $CH_4$ and $H_2O$.

The effluent gas leaves the second methanator at a temperature of about 620°F. It is cooled to a temperature of about 180°F. to condense out substantially all of the $H_2O$. The product stream has the composition shown in Table I column 7.

TABLE I

COMPOSITION OF GAS STREAMS (DRY BASIS)

| | 1 | | 2 | | 3 | | 4 | | 5 | | 6 | | 7 | |
|---|---|---|---|---|---|---|---|---|---|---|---|---|---|---|
| | Raw Process Gas | | Shifted Gas | | Acid Gas-Free Process Gas | | Methanator No. 1 Feed+$CO_2$ | | Methanator No. 1 Exit | | Methanator No. 2 Feed+CO | | Product Stream | |
| | % | MSCFH | % | MSCFH | % | MSCFH | % | MSCFH | % | MSCFH | % | MSCFH | % | MSCFH |
| $CH_4$ | 20.49 | 205 | 18.25 | 205 | 29.75 | 205 | 27.60 | 205 | 53.18 | 268 | 48.05 | 268 | 97.15 | 325 |
| CO | 13.73 | 137 | 1.25 | 14 | 2.03 | 14 | 1.89 | 14 | 0.52 | 3 | 0.47 | 3 | 0.00 | 0 |
| $H_2$ | 34.57 | 346 | 41.73 | 469 | 68.02 | 469 | 63.18 | 469 | 45.68 | 230 | 41.27 | 230 | 1.96 | 6 |
| $CO_2$ | 30.77 | 308 | 38.38 | 431 | 0.00 | 0 | 7.15 | 53 | 0.35 | 2 | 9.97 | 55 | 0.49 | 2 |
| $H_2S$ | 0.30 | 3 | 0.27 | 3 | 0.00 | 0 | 0.00 | 0 | 0.00 | 0 | 0.00 | 0 | 0.00 | 0 |
| A+$N_2$ | 0.14 | 1 | 0.12 | 1 | 0.20 | 1 | 0.18 | 1 | 0.27 | 1 | 0.24 | 1 | 0.40 | 1 |
| | 100.00 | 1000 | 100.00 | 1123 | 100.00 | 689 | 100.00 | 742 | 100.00 | 504 | 100.00 | 557 | 100.00 | 334 |

This example shows how the methanation of a syngas stream to almost pure methane i.e. more than 97 mole % $CH_4$ having a heating value of 990 BTU/SCF has been undertaken by the use of two stages of simple fixed bed adiabatic methanators. At no point in the process was there a condition where runaway methanation could occur. If this same syngas had been methanated using the conventional procedure of reacting the $H_2$ with the CO in stoichiometric proportions it would have required a very complex reactor system which is not commercially proven at this time and which could easily result in runaway reactions. Even if two separate reactor systems were used the heat release would still be too large to permit the use of fixed bed adiabatic reactors as used in the scheme proposed by this invention.

The process of the invention has been described generally and by examples with reference to hydrocarbonaceous feedstocks and scrubbing fluids of particular composition for purposes of clarity and illustration only. From the foregoing it will be apparent to those skilled in the art that various modifications of the process and the raw materials disclosed herein can be made without departure from the spirit of the invention.

We claim:

1. A process for producing a methane-rich gas stream comprising
   1. producing a raw process gas stream principally comprising CO, $H_2$, $CO_2$, and $H_2O$ and optionally containing particulate carbon, $CH_4$, $H_2S$ and COS by the partial oxidation of a hydrocarbonaceous feedstock with a free-oxygen containing gas comprising about 90 to 99.9 mole % $O_2$ and optionally with a temperature moderator, in the reaction zone of a gas generator at an autogenous temperature in the range of about 1200° to 3500°F. and a pressure in the range of about 1 to 350 atm. abs.:
   2. cooling, cleaning and adding supplemental $H_2O$ to the effluent gas stream from (1) to produce a feed gas stream for water-gas shift conversion having a mole ratio $H_2O$/CO in the range of about 2 to 8;
   3. reacting the feed gas stream from (2) in a catalytic water-gas shift conversion zone at a temperature in the range of about 650° to 950°F. and a pressure in the range of about 1 to 350 atm. abs. until at least 75 mole % of the CO is reacted with $H_2O$ to produce $H_2$ and $CO_2$;
   4. cooling, and purifying the effluent gas stream from (3) in an acid-gas purification zone and separating a $CO_2$-rich gas stream and optionally a separate stream of $H_2S$ and COS, producing a hydrogen-rich gas stream;
   5. mixing at least a portion of the $CO_2$-rich gas stream from (4) with the hydrogen-rich gas stream from (4) providing a feed gas mixture having a mole ratio $H_2/CO_2$ in the range of 4 to 10, reacting together at a temperature in the range of about 400° to 1500°F. in a catalytic methanation zone hydrogen and substantially all of the carbon oxides in said feed gas mixture, and removing from said methanation zone an effluent gas stream substantially comprising in mole % dry basis $CH_4$ 50 to 96, $H_2$ 3 to 46, CO 0 to 0.5, $CO_2$ 0.3 to 0.7, A+$N_2$ 0.2 to 8; and
   b. cooling the effluent gas stream from (5) and separating $H_2O$ therefrom to produce said methane-rich product stream.

2. The process of claim 1 wherein the pressure in steps (2) to (6) is substantially the same as that in the gas generator in step (1) less ordinary drop in the lines.

3. The process of claim 1 where in step (3) the water-gas shift reaction takes place in contact with a sulfur resistant catalyst comprising 95 mole % $Fe_2O_3$ and 4% $Cr_2O_3$.

4. The process of claim 1 wherein a portion of the $CO_2$-rich stream separated in step (4) is introduced into the gas generator in step (1) as said temperature moderator.

5. The process of claim 1 wherein said hydrocarbonaceous fuel is a liquid hydrocarbon selected from the group consisting of liquefied petroleum gas; petroleum distillates and residues, gasoline, naphtha, kerosine, crude petroleum asphalt, gas oil, residual oil, tar-sand oil, shale oil, coal oil; aromatic hydrocarbons such as benzene, toluene, xylene fractions, coal tar, cycle gas oil from fluid-catalytic-cracking operation; furfural extract of coker gas oil; and mixtures thereof.

6. The process of claim 1 wherein said hydrocarbonaceous fuel is a gaseous hydrocarbon selected from the group consisting of ethane, propane, butane, pentane, refinery gas, acetylene tail gas, ethylene off-gas, and mixtures thereof.

7. A process for producing a gaseous stream comprising about 97 mole % methane or more comprising
   1. producing a raw process gas stream principally comprising CO, $H_2$, $CO_2$, and $H_2O$, and optionally containing particulate carbon, $CH_4$, $H_2S$ and COS by partial oxidation of a hydrocarbonaceous feedstock with a free-oxygen containing gas comprising about 90 to 99.9 mole % $O_2$ and optionally with a temperature moderator, in the reaction zone of a free-flow noncatalytic gas generator at an autogenous temperature in the range of about 1200° to 3500°F. and a pressure in the range of about 1 to 350 atm. abs.;
   2. cooling, cleaning and adding supplemental $H_2O$ to the effluent gas stream from (1) to produce a feed gas stream having a mole ratio $H_2O$/CO in the range of about 2 to 8 for water-gas shift conversion;
   3. reacting the feed gas stream from (2) in a catalytic water-gas conversion zone at a temperature in the range of about 650 to 950°F. and a pressure in the range of about 1 to 350 atm. abs. until at least 75 mole % of the CO is reacted with $H_2O$ to produce $H_2$ and $CO_2$:
   4. cooling, and purifying the effluent gas stream from (3) in an acid-gas purification zone and separating a $CO_2$-rich gas stream comprising at least 95 mole % $CO_2$ and optionally a separate stream of $H_2S$ and COS, thereby producing a dry hydrogen-rich gas stream comprising in mole %: $H_2$ 52 to 93, CO 0.5 to 12, $CH_4$ 44 to 1, $CO_2$ 0 to 6, A 0.2 to 0.4, and $N_2$ 0 to 7;
   5. mixing at least a portion of the $CO_2$-rich gas stream from (4) with the hydrogen-rich gas stream to provide a feed gas mixture having a mole ratio $H_2/CO_2$ of greater than 4, and reacting substantially all of the carbon oxides in said feed gas mixture with hydrogen at a temperature in the range of about 400° to 1500°F. in a catalytic methanation zone to produce an effluent gas stream comprising at least 50 mole % $CH_4$;

6. cooling the effluent gas stream from (5) to below the dew point, separating out condensed water, and mixing same with a second portion of said $CO_2$-rich gas stream from (4) thereby producing a feed gas stream having a mole ration $H_2/CO_2$ of about 4;

7. reacting the feed gas stream from (6) in a second separate catalytic methanation zone at a temperature in the range of about 400 to 1500°F., thereby producing an effluent gas stream substantially comprising $CH_4$ and $H_2O$; and 8. cooling the effluent gas stream from (7) below the dew point, separating water therefrom, and producing said product stream comprising about 97 mole % $CH_4$, or more.

8. The process of claim 7 where the pressure in all steps is substantially that in the gas generator less ordinary drop in the line.

9. The process of claim 7 wherein a portion of the $CO_2$-rich gas stream from (4) is introduced into the gas generator in (1) as at least a portion of said temperature moderator.

10. The process of claim 7 wherein the catalyst in steps (5) and (7) comprises nickel oxide and aluminum oxide and the space velocity in each methanation zone is in the range of about 100 to 10,000 standard volumes of gas per volume of catalyst per hour.

* * * * *